United States Patent [19]

Shirakawa

[11] Patent Number: 4,982,125
[45] Date of Patent: Jan. 1, 1991

[54] BRUSHLESS MOTOR
[75] Inventor: Hiroyuki Shirakawa, Hyogo, Japan
[73] Assignee: Mitsubishi Denki Kabushiki Kaisha, Tokyo, Japan
[21] Appl. No.: 369,418
[22] Filed: Jun. 21, 1989
[30] Foreign Application Priority Data
Jun. 22, 1988 [JP] Japan ................. 63-155853
[51] Int. Cl.$^5$ .................. H02K 5/00; H02K 5/10; H02K 11/00
[52] U.S. Cl. .................. 310/88; 310/68 B; 310/89
[58] Field of Search .......... 310/40, 68 R, 68 B, 310/88, 89, 90, 91, 156, DIG. 3

[56] References Cited
U.S. PATENT DOCUMENTS

| | | | |
|---|---|---|---|
| 3,492,517 | 1/1970 | Kuraisi | 310/89 |
| 3,845,334 | 10/1974 | Harada et al. | 310/46 |
| 4,017,964 | 4/1977 | Schulte et al. | 310/89 |
| 4,128,935 | 12/1978 | Czech et al. | 310/43 |
| 4,673,836 | 6/1987 | Akiyama et al. | 310/89 |
| 4,700,093 | 10/1987 | Nigishi | 310/89 |
| 4,751,411 | 6/1988 | Fukaya et al. | 310/80 |

FOREIGN PATENT DOCUMENTS 1348886  2/1963  France ................. 310/88

Primary Examiner—Peter S. Wong
Assistant Examiner—C. La Balle
Attorney, Agent, or Firm—Sughrue, Mion, Zinn, Macpeak and Seas

[57] ABSTRACT

An inner rotor type brushless motor includes a front bracket 91 and a cup shaped frame 81 fitted thereon and a stator core 1 is pressure-inserted into the frame. A rotational position detector 13 for the rotor is arranged in the front bracket side to facilitate an assembling of the motor while providing a water-proof structure with high heat radiation characteristics.

1 Claim, 1 Drawing Sheet

BRUSHLESS MOTOR

BACKGROUND OF THE INVENTION

The present invention relates to a brushless motor for use in a vehicle, etc., and, particularly, to an improvement of a total construction thereof.

FIG. 2 is a cross section of a conventional brushless motor which comprises a stator core 1, a stator coil 2 wound on the stator core, a rotor 3 having a shaft 4 on which a rotor core 5 and a main magnet 6 are coaxially fixedly mounted and further a submagnet 7 is also fixedly mounted on the shaft 4.

A rear bracket 8 has an opening fitted on a step portion a formed on an outer periphery of the stator core 1. A front bracket 9 has an opening fitted on a step portion b formed on the other outer peripheral edge of the stator core 1. The stator core 1, the rear bracket 8 and the front bracket 9 are assembled all together by through-bolts 10, the number of which is usually 3 to 4.

A rear bearing 11 is supported by the rear bracket 8 and a front bearing 12 is supported by the front bracket 9. The bearings 11 and 12 support opposite end portions of the shaft 4 rotatably.

A Hall element 13 is supported by a holder plate 14 fixed by screws to an inner wall of the rear bracket 8. The Hall element is positioned in opposing relation to the submagnet 7 for detecting the rotational position of the rotor 3, upon which the direction of current supplied from a drive circuit which is not shown to the stator coil 2 is switched sequentially to thereby obtain a continuous rotation of the rotor.

As shown, the submagnet 7 and the Hall element 13 are arranged within a space provided on the rear side. This is because a large space can be provided in this portion since the size of the rear bearing 11 on the end opposite to the output end is usually smaller than that of the front bearing 12.

Since the conventional brushless motor is constructed as mentioned above in which there are the fitting step portions a and b provided on the outer peripheral edges of the stator core 1 for the rear bracket 8 and the front bracket 9, respectively, there is a tendency of water invasion through the fitting portions into the motor and through gaps around the through-bolts 10 when the motor is used for a vehicle. Therefore, it is necessary to provide packings for these portions or a cover for covering the whole motor, which makes the construction complicated and the size larger.

SUMMARY OF THE INVENTION

An object of the present invention is to provide a water-proof, high heat-radiation brushless motor.

In a brushless motor according to the present invention, a detection means for detecting a rotational position of the rotor is moved to a front side (an output end side of the shaft) and a frame is provided instead of the rear bracket which is fitted to a front bracket, in which a stator core is pressure-inserted.

The brushless motor according to the present invention has only one fitting portion between the front bracket and the frame, which is advantageous in providing a water-proof structure. Since an outer periphery of the stator core is in pressure-contact with an inner periphery of the frame, heat radiation of the stator core is improved. Since the detection means is in the front side, it does not form an obstacle in assembling the motor.

DETAILED DESCRIPTION OF THE PREFERRED EMBODIMENT

Figure 1:
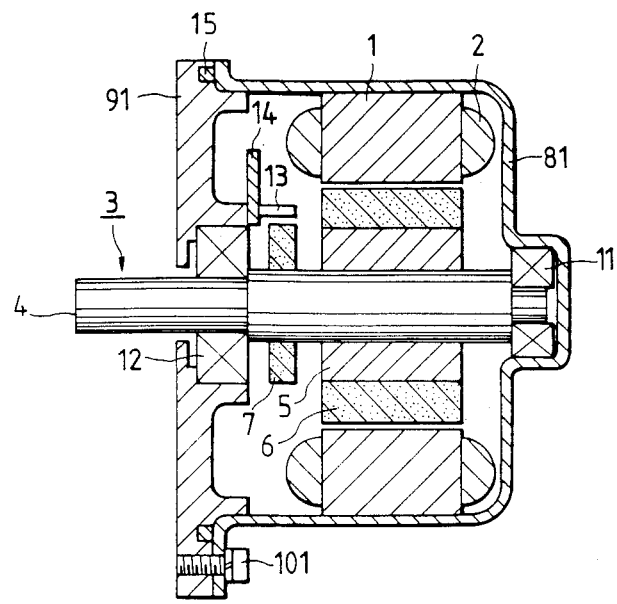
FIG. 1 is a cross section of a brushless motor according to an embodiment of the present invention.

An embodiment of the present invention will be described with reference to FIG. 1. In FIG. 1, a brushless motor according to the present invention comprises a stator core 1, a stator coil 2 wound on the stator core 1, a rotor 3 including a shaft 4, a rotor core 5 and a main magnet 6 mounted fixedly and coaxially on the shaft 4 and a submagnet 7 also mounted on an output side of the shaft.

An output end portion of the shaft 4 is supported by a front bearing 12 supported by a front bracket 91 and the other end portion of the shaft 4 is supported by a rear bearing 11 supported by a bowl shaped frame 81. The frame 81 may be prepared by drawing a metal plate. The stator core 1 is pressure-inserted into the frame 81 and secured therein. The frame 81 has an opening with which the frame is fitted on an outer periphery of the front bracket 91. The frame 81 and the front bracket 91 are secured together by a plurality of bolts 101.

A Hall element 13 is supported by a holder plate 14 fixed to the front bracket 91 suitably.

The Hall element 13 is arranged in opposing relation to the submagnet 7 on the shaft 4 to detect the rotational position of the rotor 3, upon which current supplied from a drive circuit, not shown, to the stator coil 2 is switched sequentially so that a continuous rotation of the rotor is obtained.

A packing 15 is provided in a groove formed along an outer peripheral portion of the front bracket 91, which is elastically deformed by pressing the frame 81 to the front bracket 91 to prevent an invasion of fluid into an interior of the motor.

Figure 2:
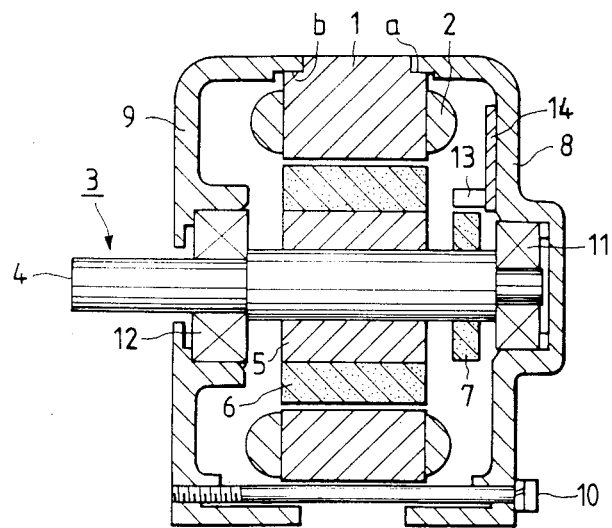
FIG. 2 is a cross section of a conventional brushless motor.

According to the embodiment of the brushless motor constructed as mentioned above, in which the stator core 1 is pressure inserted into the inner periphery of the frame 81 and its open end is directly fitted to the front bracket 91, the number of fittings is reduced to one and the through-bolts 10 used to assemble the rear bracket 8, the stator core 1 and the front bracket 9 of the conventional motor shown in FIG. 2 can be omitted. Further, since the submagnet 7 and the Hall element 13 on the holder plate 14 are arranged in the front bracket side, the structure of the frame 81 can be simple enough to employ the drawing of metal plate to form it.

It may be possible to made the frame 81 by casting with the same effect.

As mentioned, according to the present invention, the means for detecting rotational position of the rotor is arranged in the front bracket side and the frame having the simple structure is used instead of the rear bracket. Therefore, it is possible to pressure insert the stator core without degrading the assembling work, resulting in a facilitated assembling of the motor with water-proof and high heat radiation characteristics.

What is claimed is:

1. An inner rotor type brushless motor, comprising: a substantially planar front bracket (91) having a central aperture supporting a front bearing (12), a cup-shaped, draw formed metal frame (81) fitted to said front bracket at an open, outwardly flanged end thereof and having a closed, outwardly recessed opposite end supporting a rear bearing (11), a rotor (3) including a shaft (4), a rotor core (5) fixed mounted coaxially on said shaft and a permanent magnet (6) fixedly mounted coaxially on said rotor core, said shaft being rotatably supported by said front and said rear bearings, a stator core (1) fixedly supported on an inner peripheral surface of said frame, a stator coil (2) wound on said stator core, and detection means (7,13) provided adjacent to said front bearing for detecting a rotational position of the rotor, wherein said detection means comprises a submagnet fixedly mounted on said shaft and a Hall element arranged in opposing relation to said submagnet, and wherein said front bracket is formed with an annular groove along an outer peripheral edge thereof facing inwardly of said motor, and an annular packing member (15) is fitted therein to provide a liquid-tight seal between said front bracket and said frame flange.

* * * * *